United States Patent [19]
Ballinger

[11] 3,968,920
[45] July 13, 1976

[54] CAPSTAN AND MOTOR ASSEMBLY
[75] Inventor: Dale O. Ballinger, Denver, Colo.
[73] Assignee: Honeywell Inc., Minneapolis, Minn.
[22] Filed: Feb. 12, 1975
[21] Appl. No.: 549,317

[52] U.S. Cl. .............................. 226/188; 226/194; 310/266
[51] Int. Cl.² .......................................... B65H 17/20
[58] Field of Search .......... 226/168, 174, 188, 190, 226/194; 310/266

[56] References Cited
UNITED STATES PATENTS
| | | | |
|---|---|---|---|
| 3,326,440 | 6/1967 | Barnes | 226/188 |
| 3,428,233 | 2/1969 | Hokkinen | 226/188 X |
| 3,490,672 | 1/1970 | Fisher | 226/188 |

Primary Examiner—Richard A. Schacher
Attorney, Agent, or Firm—Laurence J. Marhoefer; Lockwood D. Burton; Mitchell J. Halista

[57] ABSTRACT

A capstan drive motor having a integrated motor armature and driving capstan assembly with the capstan being mounted directly in one end of a rotatable center shaft of the motor with the other end of the shaft supporting an armature of the motor. The center shaft is rotatably supported on bearings positioned by adjustable mounts and with one of the bearing mounts having a cantilevered structure for temperature compensation of the shaft and bearing support system.

5 Claims, 2 Drawing Figures

CAPSTAN AND MOTOR ASSEMBLY

BACKGROUND OF THE INVENTION

1. Field of the Invention

The present invention is directed to capstan motors. More specifically, the present invention is directed to a capstan motor having a central rotatable shaft with a capstan and a drive armature located at opposite ends of the shaft along with shaft bearing supports.

2. Description of the Prior Art

In contemporary magnetic tape handling devices, a record medium such as a magnetic tape, is required to be moved past a magnetic transducer at a relatively high speed to accomplish either storage or read-out of information magnetically stored on the recording medium. Such data storage devices store or recover information only when the medium is traveling at a constant speed whereby the response of the storage system is a function of the ability of the system to accellerate and decellerate the recording medium and to maintain the operating speed of the recording medium at a preselected speed. Prior art devices have used capstan motors driving a tape drive capstan with intermediate mechanical drive elements interposed between the drive motor and the capstan. Such prior art devices are subject to torsional flexibility and cause unwanted oscillations and speed fluctuations at the capstan. Recent developments have been directed toward providing a combined capstan and motor structure which does not utilize any intermediate mechanism wherein the motor and capstan is an integrated construction. An example of such a prior art motor-capstan construction is found in U.S. Pat. No. 3,490,672. However, such prior art devices, while eliminating many of the problems associated with the intermediate mechanism between the motor and the capstan, still exhibit inherent problems which stem from dimensional differences between the rotatable shaft and the housing caused by temperature variations which dimensional differences affect the preload stress on the support bearings. Such preload stress variations result in large differences in the track followed by the ball bearing in a ball bearing raceway, which variations result in changes in the capstan run-out, or eccentricity, to produce unstable tape movements. Thus, such temperature differences which may be the result of ambient or previous immediate history of motor temperature conditions result in undesired driving conditions for the magnetic tape and cannot be reduced by a simple increase in the tolerances on capstan dimensional finishing.

SUMMARY OF THE INVENTION

An object of the present invention is to provide an improved integrated motor-capstan structure which minimizes temperature effects on capstan run-out.

In accomplishing this and other objects there has been provided, in accordance with the present invention an integrated motor-capstan construction including a magnetic field producing means, an armature arranged for rotation in the magnetic field producing means and a central shaft supporting the armature at one end thereof and a capstan surface for driving a web member at the other end. The central shaft is supported in bearings at both ends with one bearing being supported on a first stub shaft while the other bearing is supported on a second stub shaft which is selectively adjustable by a cantilevered support with respect to an outer housing surrounding the center shaft, armature and capstan.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Detailed Description

Figure 1:
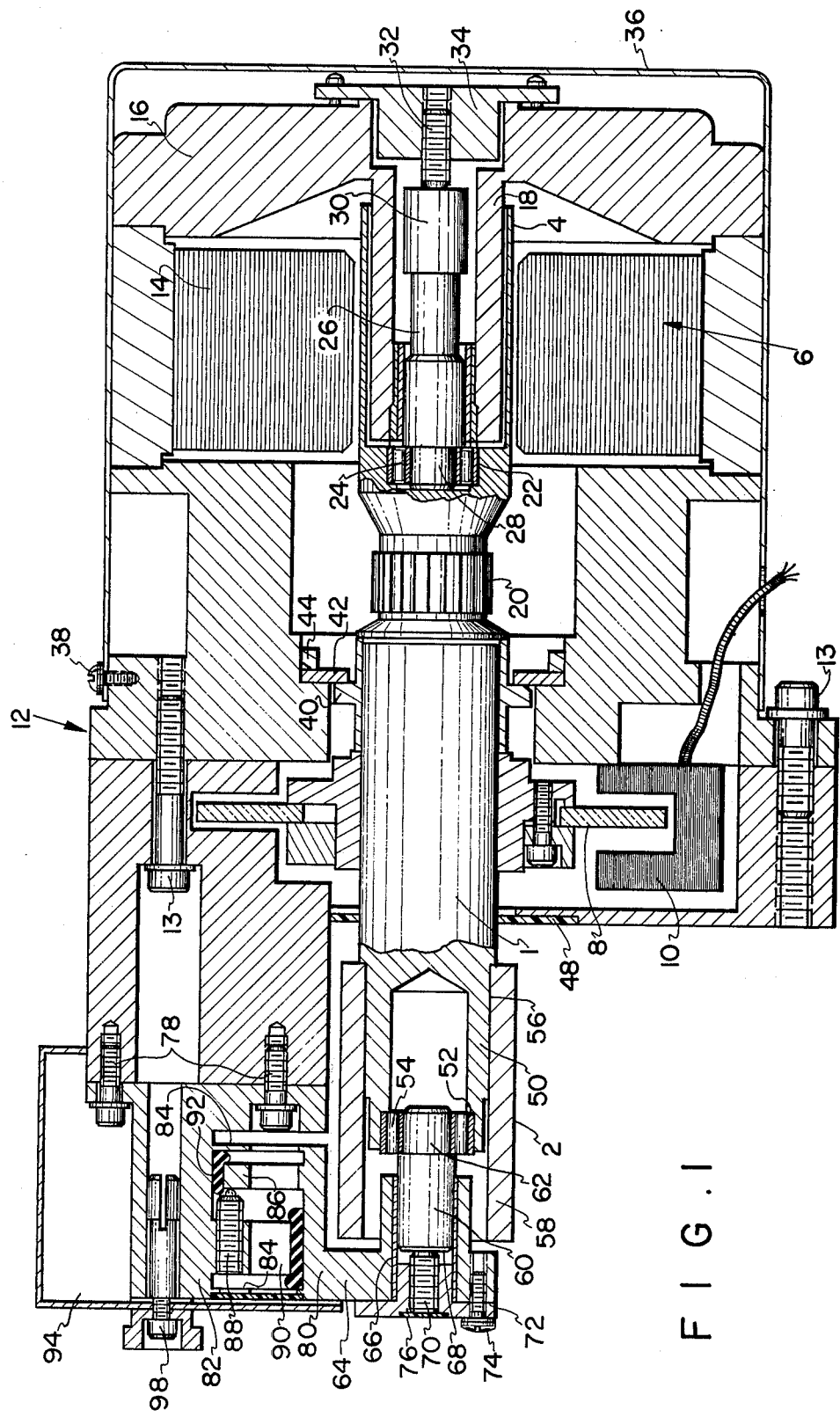
FIG. 1 is a cross-sectional illustration of an integrated motor-capstan assembly embodying the present invention.
Figure 2:
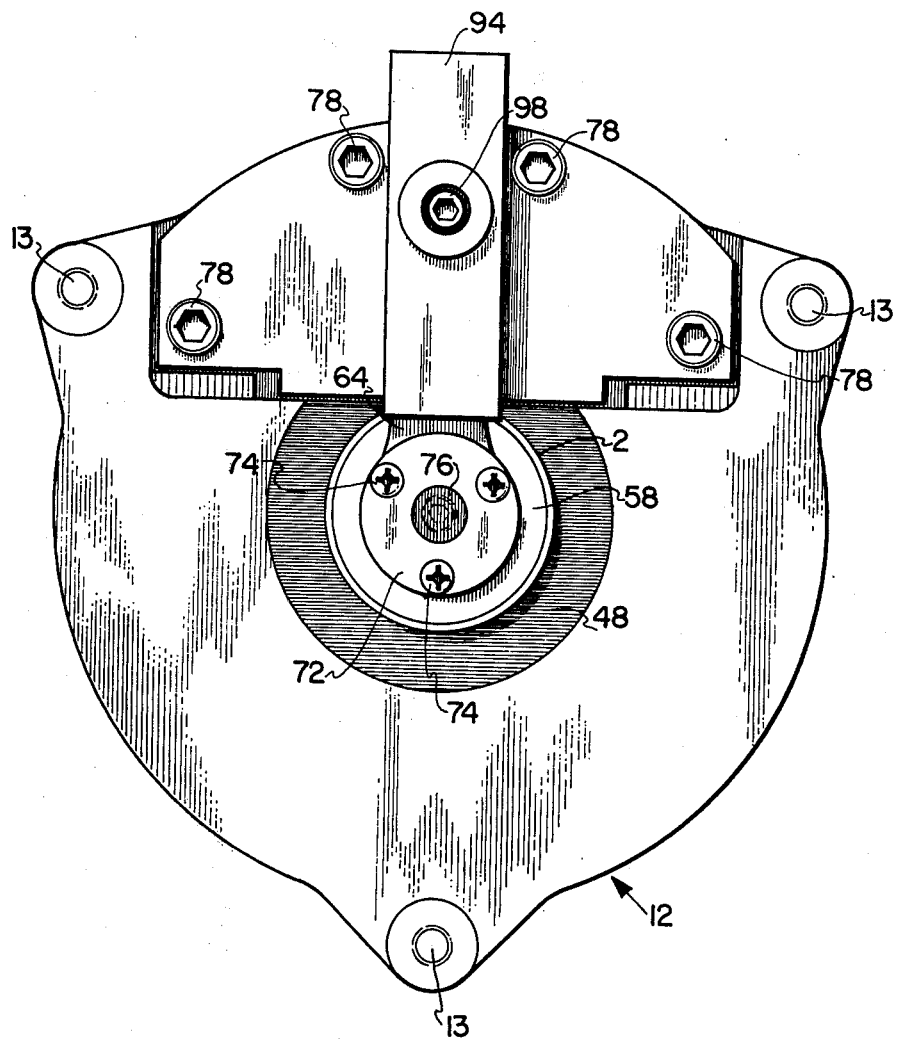
FIG. 2 is an end view of the capstan end of the motor-capstan assembly shown in FIG. 1.

Referring to FIGS. 1 and 2 in more detail, there is shown, respectively, a cross-sectional view of a motor-capstan assembly and an end view of the capstan end of the assembly. A central shaft 1 has a capstan surface 2 attached to one end thereof while the other end of the central shaft 1 is attached to a hollow armature assembly 4. The armature 4 cooperates with a field producing means 6 located adjacent to the hollow armature to produce a driving torque on the central shaft. A conventional tachometer disc 8 is fastened to the central shaft and cooperates with a light producing means and photo diode means in a sensor assembly 10 located adjacent to the tachometer disc 8 in a manner well-known in the art. A split outside casing 12 of the motor-capstan assembly is arranged to surround the central shaft 1 and to enclose the tachometer disc 8 and the sensor means for reading the tachometer disc 8. The halves of the split outside casing 12 are held together by a plurality of cap screws 13. The hollow shell armature 4 is arranged to cooperate with a permanently magnetized stator assembly 6 forming an outer cylindrical end of the motor. The stator assembly 6 is attached to one end of the motor casing 12 and includes a plurality of equally spaced, inwardly directed pole pieces 14 attached to the inner cylindrical surface of the housing. The pole pieces are formed from a permanent magnet material and are attached to the inner surface of the stator assembly by any suitable means (not shown). A pole facing (not shown) may be attached to the inner surface of each pole piece 14 to complete the stator assembly. An end bell 16 is attached to one end of the stator assembly by any suitable means (not shown) and is cast integrally with a cylindrically shaped flux return member 18 formed from a high magnetic permeability material. The flux return member 18 extends inwardly along the central axis of the permanent magnet stator assembly 6 with an annular spacing between the flux return member 18 and the stator pole pieces 14. The flux return member is bored along its central longitudinal axis to receive a shouldered shaft therein. The shell armature 4 is positioned in the space between the flux return member 18 and the pole pieces 14 and is electrically connected to a commutator 20 supported on the central shaft 1 and having equally spaced copper bars about its periphery. The commutator 20 is arranged to cooperate with motor brush assemblies (not shown) which bear against the commutator 20. The hollow armature shell 4 has an internal coaxial recess 22 provided therein adjacent to the commutator 20 for receiving a ball bearing 24.

A shouldered shaft 26 has a first end 28 seated within the inner diameter of the ball bearing 24. The other end 30 of the shouldered shaft 26 is arranged to bear against a setscrew 32 which, in turn, is mounted within a rear drive setscrew support plate 34. The setscrew support plate, in turn, is supported on the end bell 16. An end cover 36 is attached to the motor end of the outside casing 12 and is arranged to enclose the end bell 16, the setscrew support the plate 34 and, the stator assembly 6. The end cover is attached to the outside casing 12 by a plurality of machine screws 38. Further details of the shell motor structure and the operation thereof may be found in U.S. Pat. No. 3,418,505 which is assigned to the same assignee as the present invention.

The tachometer disc 8 is supported on the central shaft 1 which is also provided with a outwardly extending peripheral lip 40 adjacent to the tachometer disc 8. A resilient annular seal 42 is attached to the outside casing 12 by an internally expanding lock washer 44 and is arranged to bear against the peripheral lip 40 to isolate the tachometer disc 8 from the commutator 20 and shell armature 4 assembly. A second resilient annular member 48 is located on the other side of the tachometer disc 8 from the aforesaid radially extending lip 14 and is arranged to be attached to the outside casing 12 by any suitable means (not shown) while allowing the central shaft 1 to pass therethrough whereby the tachometer disc 8 is effectively isolated and protected from foreign matter contamination on both sides thereof. An end extension 50 of the central shaft 1 is provided on the other side of the second resilient member 48 from the tachometer disc 8. This end extension is provided with an internal recess 52 for receiving a second ball bearing 54 and is provided with a relieved longitudinally extending external surface 56 for receiving the inner surface of a hollow capstan member 58 thereon. The capstan member 58 is pressed onto the surface 56 and may be rigidly attached by any suitable means, e.g., an adhesive applied between the surface 56 and the hollow capstan member 58.

A short shouldered shaft 60 is arranged to have a reduced diameter end portion 62 which engages the inner diameter of the second bearing 54 while the other end of the shouldered shaft 60 is retained within an adjustable cantilevered end plate 64. The end plate 64 forms a support for the central shaft 1 and is provided with a central bore 66 for accepting the end of the shouldered shaft 60 which has an end face 68 bearing against a setcrew 70 threaded into a setscrew support plate 72. The setcrew support 72 is attached to the end plate 64 by a plurality of threaded screws 74 while the setscrew 70 is covered by a removable cover 76 fitting into an annular recess surrounding the setscrew 70 in the outer face of the setscrew support 72. The end plate is attached to the end of the outside casing 12 housing by a plurality of cap screws 78. The end plate 64 is internally subdivided into two portions 80 and 82 connected by a plurality of interconnecting thin ribs 84 forming a cantilever structure. A first projecting ridge 86 is provided in the first portion 80 to cooperate with a third setscrew 88 mounted in a second projecting ridge 90 in the second portion 82 whereby the first portion 80 may be adjusted with respect to the second portion 82.

The first and second ridges 86 and 90 are only interconnected by the setscrew 88 whereby the first portion 80 of the end plate 64 may be selectively positioned with respect to the second portion 82. This operation is effected by an adjustment of the third setscrew 88 to produce a slight bending of the ribs 84. Such a displacement of the two portions 80 and 82 of the end plate 64 is effective to control the pre-load stress applied to the capstan bearing 54. The capstan bearing 54 is located substantially at the longitudinal center of the hub surface 2 to balance the tape load on the capstan 58. The thin ribs 84 retain a rigidity of the capstan 58 along two axes while allowing motion along the third axes to allow dimensional differences due to temperature variations between the central shaft 1, the outside casing 12 and the end plate 64 to be accomodated without affecting the preload on the central shaft 1 support bearings. Accordingly, changes in the track followed by the ball bearings in their raceways are avoided by maintaining a constant bearing preload. Thus, the run-out of the capstan 58 is held at a desired value over a wide ambient temperature range and independently of the immediately prior temperature history of the motor-capstan assembly.

Pads of resilient material 92 may be interposed between the ridges 86 and 90 and the respective portions 80 and 82 of the end plate 64 to minimize any vibrations of the portions 80 and 82. A third cover 94 is located on the second portion 82 to cover the ribs 84, the ridges 86 and 90 the resilient material pads 92 and the setscrew 88. The cover 94 is spaced from the first portion 80 of the end plate 64 and is attached to the second portion by any suitable means, e.g., capscrew 98.

Accordingly, it may be seen that there has been provided, in accordance with the present invention, an integrated motor-capstan structure which minimizes temperature effects on capstan run-out.

The embodiments of the invention in which an exclusive property or privilege is claimed are defined as follows:

1. A motor-capstan assembly comprising
   a motor means,
   a capstan means,
   means connecting said motor means to said capstan means,
   bearing means for rotatably supporting said motor means, said capstan means, and said last-mentioned means, and
   bearing support means including a flexible cantilevered structure for supporting said bearing means at least at one end of the combination of said motor means, said capstan means and said means connecting said motor means to said capstan means.

2. A motor-capstan assembly as set forth in claim 1 wherein said cantilevered structure includes a first structure portion, a second structure portion and flexible rib means connecting said first portion to said second portion.

3. A motor-capstan assembly as set forth in claim 2 wherein said cantilevered structure includes adjustable spacing means supported by said first portion and bearing against said second portion to induce a selective bending of said rib means.

4. A motor-capstan assembly as set forth in claim 3 wherein said first portion includes means for supporting said bearing means and said capstan means.

5. A motor-capstan assembly as set forth in claim 4 wherein said second portion is attached to said motor means and said first portion includes means for preloading said bearing means supported by said first portion.

\* \* \* \* \*